United States Patent [19]

Kanakia

[11] Patent Number: 5,309,432
[45] Date of Patent: May 3, 1994

[54] HIGH-SPEED PACKET SWITCH

[75] Inventor: Hemant R. Kanakia, New Providence, N.J.

[73] Assignee: AT&T Bell Laboratories, Murray Hill, N.J.

[21] Appl. No.: 877,041

[22] Filed: May 6, 1992

[51] Int. Cl.⁵ .............................................. H04L 12/56
[52] U.S. Cl. ....................................... 370/60; 370/94.1
[58] Field of Search ....................... 370/60, 60.1, 94.1, 370/94.2, 67, 61, 58.1, 58.2, 58.3

[56] References Cited

U.S. PATENT DOCUMENTS

| | | | |
|---|---|---|---|
| 5,117,429 | 5/1992 | Lagoutte | 370/60 |
| 5,187,780 | 2/1993 | Clark et al. | 370/60 |

OTHER PUBLICATIONS

Kozaki, T., et al., "32×32 Shared Buffer Type ATM Switch VLSI's for B-ISDN's" IEEE J. on Selected Areas in Comm. vol. 9, No. 8, Oct. 1991.
Shobatake, Y., et al., "A One-Chip Scalable 8 * 8 ATM Switch LSI Employing Shared Buffer Architecture", IEEE J. on Selected Areas in Comm. vol. 9, No. 8, Oct. 1991.
Tobagi, F. A., "Fast Packet Switch Architectures for Broadband Integrated Services Digital Networks", Proc. of the IEEE, vol. 78, No. 1, Jan. 1990.
Chiussi, F. M., and Tobagi, F. A., "A Hybrid Shared-Memory/Space-Division Architecture for Large Fast Packet Switches", SUPERCOMM ICC '92, Paper 332.5, Chicago. Ill. Jun. 14-18, 1992.

*Primary Examiner*—Wellington Chin
*Attorney, Agent, or Firm*—Gordon E. Nelson

[57] ABSTRACT

A packet switch of the type in which packets received in the switch are stored in memory until they are output. In the switch fabric of the switch, packets are serially received in input shift registers wide enough to store an entire packet, output in parallel to memory which is as wide as the input shift register, moved in parallel in the memory, and output in parallel to an output shift register. The bus connecting the input shift registers, the output shift register, and the memory is as wide as the input shift register, but does not cross the boundaries of the semiconductor chips making up the switch fabric, thus avoiding the electrical problems of very wide buses. In the disclosed implementation, there are 14 input lines and 14 output lines. A switch memory is associated with each output line and receives packets from all 14 input lines, accepting only those destined for the output line associated with the input line. Each switch memory includes a controller, memory and a communications interface for the controller, and a set of switch memory VLSI devices. Each switch memory VLSI device includes a first shift register for receiving slices of the packet and a bus, a memory, and a second shift register for outputting the slices. The bus, the memory, and the second shift register are as wide as the first shift register.

24 Claims, 4 Drawing Sheets

HIGH-SPEED PACKET SWITCH

BACKGROUND OF THE INVENTION

1. Field of the Invention

The invention concerns packet switching generally and packet switching in very high-speed networks in particular.

2. Description of the Prior Art

Figure 1:
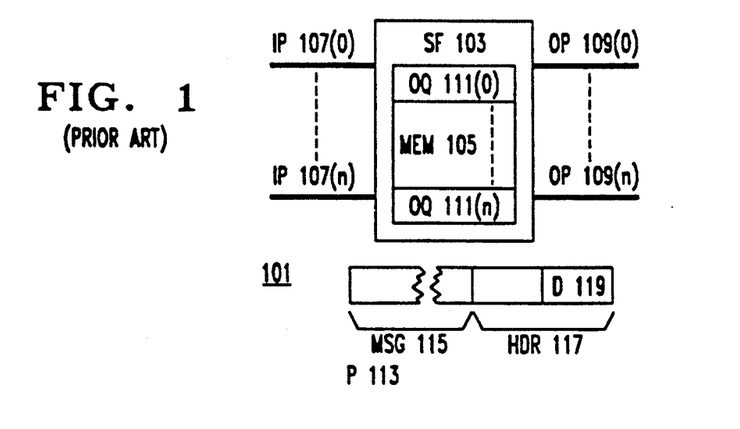
FIG. 1 is a block diagram of a prior-art packet switch which employs memory.

Increasingly, devices communicate with each other by sending packets of digital data. As shown in FIG. 1, a packet (P 113) is a sequence of bits which one device sends another. Packets generally have two parts: a message (MSG 115), which is the sequence of bits which make up the actual message which is being sent, and a header (HDR 117), which contains control information which the communications system over which the packet is sent uses in transferring the message. At a minimum, header 117 will contain destination (D 119), a value which indicates the destination to which the message is directed. Header 117 may also contain information such as the length of message 115, the type of message 115, or the source of message 115. The manner in which destination 119 indicates the destination will depend on the kind of communications system over which the message is sent. For example, destination 119 may specify the address of the device which is to receive the packet in the network or it may specify a virtual circuit which is currently connecting the source of the packet with its destination.

One way of sending packets between devices is by means of a switched network. A switched network is made up of nodes connected by incoming and outgoing links. A packet switch at each node of the network receives packets on its incoming links, determines from destination 119 where each packet is going, and switches the packet to the outgoing link which will take it to its destination.

FIG. 1 shows a prior-art packet switch 101. Packet switch 101 receives packets from a number of input links at input ports (IP) 107(0 ... n), switches the packets in switch fabric (SF) 103, and outputs them to output links at output ports (OP) 109(0 ... n). In most common kinds of prior-art packet switches, switching fabric 103 includes memory 105. Memory 105 contains at a minimum an output queue (OQ) 111 for each output port 109. Switch fabric 103 does the switching by placing each packet received on an input port 107 onto the tail of output queue 111 for output port 109 for the output link which will take the packet to its destination. As switch fabric 103 adds incoming packets 113 to the tails of the output queues, it takes outgoing packets 113 from the heads of the output queues 111 and provides them to output ports 109 corresponding to the queues 111.

A problem with packet switches in modern networks is the switch is often unable to keep up with the speed at which the links can operate. For example, a glass fiber link can operate at speeds of 1 Gigabyte/second. If the switch cannot keep up with that speed, that is, unless the switch can handle simultaneous inputs from a number of links operating at that speed, the network will not be able to use the full capacity offered by the links, but will instead be limited by the rate at which the switches can transfer packets from one link to another. A survey of architectures for fast packet switches may be found in Fouad A. Tobagi, "Fast Packet Switch Architectures for Broad-band Integrated Services Digital Networks", *Proceedings of the IEEE*, vol. 78, No. 1, January, 1990.

A particularly troublesome area in designing packet switches of the type of packet switch 101 is the limitations that memory 105 places on operating speed. Modern packet switches are of course made up of integrated circuits; in particular, memory 105 is made up of a number of off-the-shelf dynamic RAM integrated circuits. Memory 105 must be both large and fast; however, off-the-shelf dynamic RAM integrated circuits are either large and slow or small and fast. For example, current CMOS memories of 256 Kbits have a cycle time of 35 ns, while those of 4 Mbits have a cycle time of 200 ns. Worse, the product of memory size with cycle time has remained remarkably constant over generations of memory technologies.

If switch 101 is to operate at the necessary speed, enough fast memory integrated circuits must be provided so that memory 105 is wide enough to store an entire packet in a single row of the memory, so that the entire packet can be written to or read from memory 105 in a single operation. Further, the packet must be carried to and from the memory by a bus which is as wide as the memory. However, as a bus becomes wider, it also becomes slower. The large number of parallel lines increases distortion and skew in the data signals, and the bus cycle time must be increased to counteract these effects. Further, crosstalk between the many data lines increases the noise level, so that larger bus drivers and more sensitive receivers are required. As a result of all of these factors, the speed advantages gained by a wide memory 105 are limited by the slowness of the bus which connects the memory integrated circuits making up memory 105 to the remaining integrated circuits making up switch fabric 103 and switch 101 cannot provide provide the gigabytes/second transfer rate which is needed.

It is an object of the high-speed packet switch disclosed in this patent application to overcome the foregoing problems and limitations of prior-art packet switches.

SUMMARY OF THE INVENTION

In one aspect, the invention is a switch fabric for switching packets. The switch fabric includes

- packet receiving means coupled to a plurality of input ports for serially receiving the packets from the input ports;
- packet outputting means coupled to a plurality of output ports for serially outputting the packets to the output ports;
- memory means for storing the packets; and
- transfer means for transferring the packets in parallel between the packet receiving means, the packet outputting means, and the memory means, the switch fabric being fabricated in one or more integrated circuits such that the transfer means remains within the boundaries of the integrated circuits.

Other aspects of the invention include the following:

- A packet switch which employs the above switch fabric.
- A VLSI integrated circuit which implements a slice of the above switch fabric.
- a switch fabric in which there is a plurality of packet receiving means and each of the packet receiving means receives packets at a rate which is independent of the rates at which the other packet receiving means receive the packets. In this switch fabric, there is also a plurality of packet outputting means, and each of them outputs packets at a rate which is independent of the rates at which the other packet outputting means output the packets.

A switch fabric in which there are packet transfer means for moving packets in parallel between the packet receiving means, the packet outputting means, and the packet memory means and moving means for moving the packets in parallel between the locations in the packet memory means.

The foregoing and other objects and advantages of the invention will be apparent to one of ordinary skill in the art who peruses the following Drawing and Detailed Description, wherein:

The reference numbers employed in the Drawing and the Detailed Description have three or more digits. The two least significant digits are a number within a figure; the remaining digits are the figure number. Thus, the element with the reference number "305" is first shown in FIG. 3. Further, individual ones of repeated elements are represented by means of numbers or letters in parentheses following the reference number of the element. Thus, 303(o) means the first one of element 303, while 303(j) means any one of the elements 303.

DETAILED DESCRIPTION

The "Detailed Description" will describe a high-speed packet switch which has been implemented according to the principles of the invention. The description will begin with an overview of the packet switch, will then describe the switch memory component of the packet switch, and will finally describe a novel very large scale integrated circuit (VLSI) employed in the switch memory component. In the following, the terms serial and parallel are used as follows: a set of portions of a packet is processed serially when the portions belonging to the set are sequentially processed in the order in which the portions occur in the packet; the set of portions is processed in parallel when all of the portions in the set are processed at once.

Figure 2:
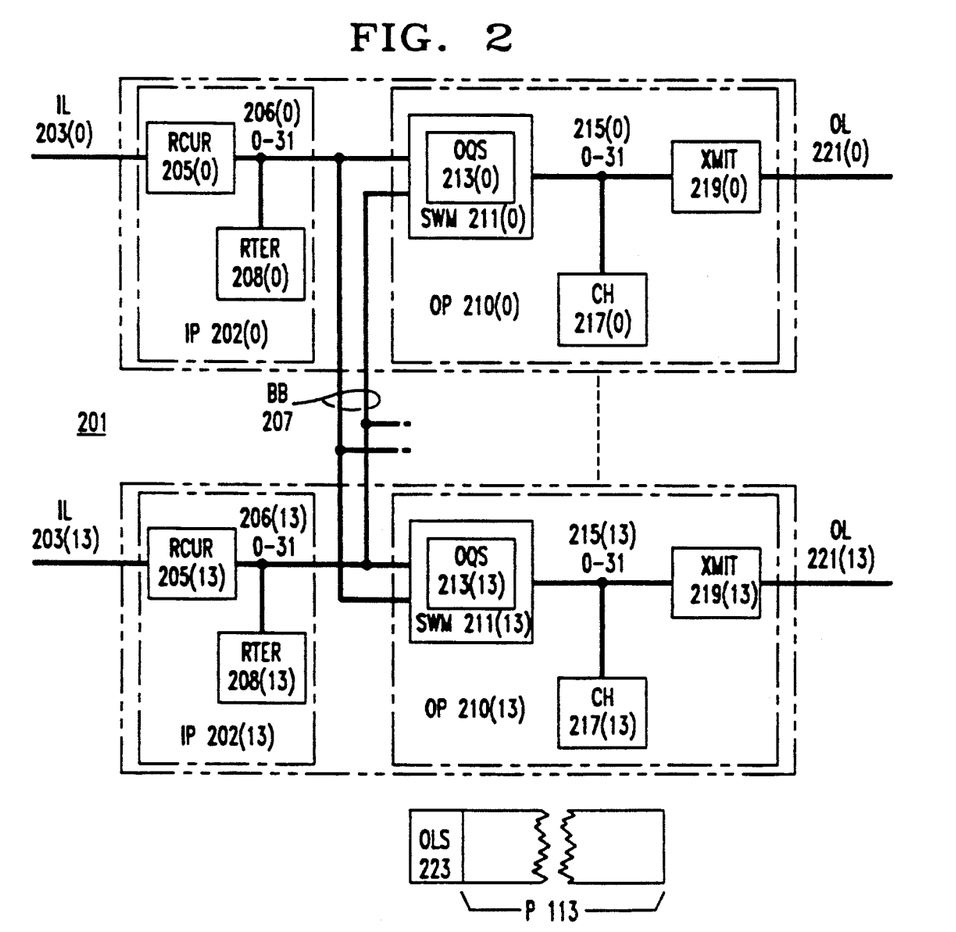
FIG. 2 is a block diagram of a packet switch which is built according to the principles of the invention.

Overview of the High-Speed Packet Switch: FIG. 2

FIG. 2 provides an overview of a high-speed packet switch 201 which is implemented according to the principles of the invention. High-speed packet switch 201 receives packets simultaneously from 14 serial input links (IL) 203 (0 . . . 13) and provides them simultaneously to 14 serial output links (OL) 221 (0 . . . 13). The packets travel in the input links 203 and output links 221 as a serial sequence of single bits, as indicated by the "1" notation on the links. Because packets are processed simultaneously, there is consequently an input portion (IP) 202(i) of packet switch 201 corresponding to each input link 203(i) and an output portion (OP) 210(i) corresponding to each output link 221(i). The input portions 202 are coupled to the output portions 210 by means of broadcast bus 207; broadcast bus 207 carries packets received by each of the input portions 203 to all of the output portions 210; as will be explained in more detail later, output portion 210(j) corresponding to an output link 221(j) only accepts packets which will reach their destinations via output link 221(j). This interaction between broadcast bus 207 and output portions 210 thus enables switch 201 to switch packets as required by the packet's destination 109. As is apparent from the foregoing, switch 201 may be implemented with more or less than 14 input and output links and there may even be more or fewer input links than output links.

Since each of the input portions 202 and output portions 210 is substantially identical to the others, the remainder of the discussion of FIG. 2 will deal with a single input portion 202(h) and a single output portion 210(i). Receiver 205(h) in input portion 202(h) receives packets serially from a fiber optic link and outputs each packet it receives as a serial sequence of 32 bit words on a 32-bit bus 206(h) which is connected to router 208(h) and to broadcast bus 207. Receiver 205(h) is made of two standard devices: AT & T's ODL200 part converts between electrical and optical signals and Advanced Micro Devices' TAXI receiver chip (part number AM7969) converts the single-bit serial input stream into a serial stream of 32-bit words. Router 208(h) watches for headers 117 and packet ends. When router 208(h) detects a header 117, it copies destination 119 from the header 117 and determines from destination 119 and a table in router 208(h) which relates destinations to output links what the proper output link 221 is for the packet. Then, when it detects the end of the packet, it appends an output link specifier (OLS) 223 to the end of the packet. Routing functions are described in detail in J. D. Bertsekas and R. Gallagher, Data Networks, Prentice Hall, 1987.

In the preferred embodiment, output link specifier 223 is two 32-bit words. Bits 28–31 of each of the two 32-bit words specify the output link. There are three possibilities:

Output to a single output link 221(j): bits 28–31 of the first 32-bit word have the value 8, expressed hexadecimally; bits 28–31 of the second 32-bit word have the number "j" (i.e., a number between 0 and 13), expressed hexadecimally.

Output to all output links 221(0 . . . 13): bits 28–31 of both words have the hexadecimal value 0.

Output to a group of output links 221: bit 28 of the first word has the value 0 (in the hexadecimal value 8, this bit has the value 1); bits 29–31 of the first word and 28–31 of the second word have a seven-bit group code specifying a group of output links.

As the sequence of 32-bit words which contain the packet are output to broadcast bus 207, they are received and stored in each of the switch memories 211. At the same time, each of the other input portions 202 in switch 201 may be receiving packets and outputting 32-bit words to broadcast bus 207, and each switch memory 211 stores the 32-bit words which it receives from those input portions 202 as well.

When output link specifier 223 for a packet arrives in the switch memories 211, each switch memory 211(i) determines from output link specifier 223 whether the packet is to be output on output link 221(i). If not, switch memory 211(i) simply discards the stored packet; if it is, switch memory 211(i) transfers the stored packet (without the output link specifier) to output queues 213(i), a memory which contains one or more output queues of packets to be output via output link 221(i).

Switch memory 211(i) services the queues in output queues 213(i) in a programmed order. The packet at the head of the queue currently being serviced is output as a sequence of 32-bit words on bus 215(i). Chopper 217(i) reads header 117 to determine the length of the packet and counts the bytes of the packet as they are transmitted on bus 215(i). When the last byte has been transmitted, chopper 217(i) signals the end of the packet to switch memory 211(i) and transmitter 219(i). As transmitter 219(i) receives the 32-bit words on bus 215(i), it transmits the bits in the words sequentially onto output link 221(i). It ceases transmitting in response to the signal from chopper 217(i). Switch memory 211(i) responds to the same signal by placing the first 32 bits of the next packet to be transmitted on bus 215(i).

Figure 3:
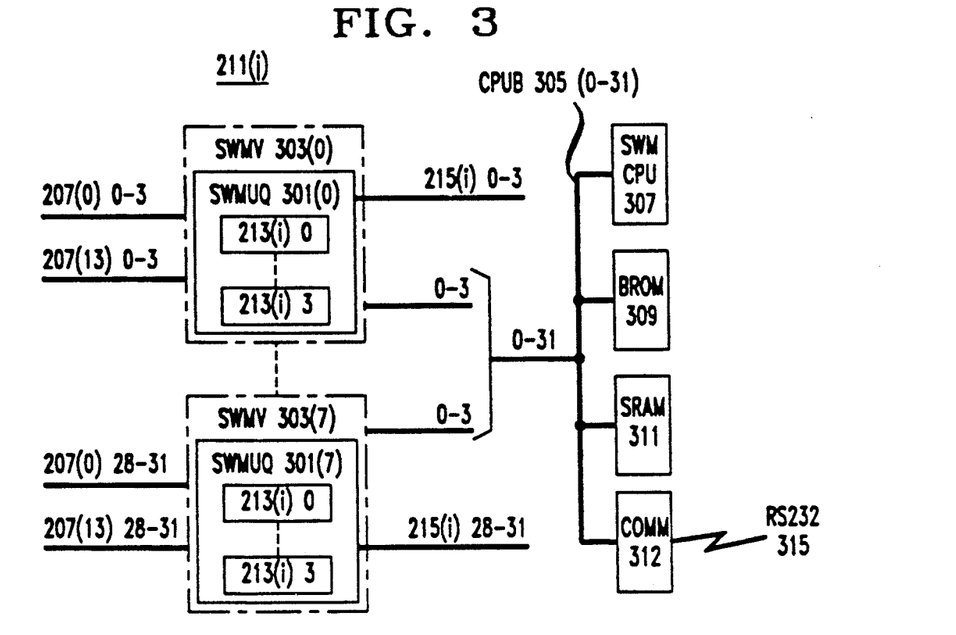
FIG. 3 is a block diagram of the switch memory component of the packet switch of FIG. 2.

Detail of a Switch Memory 211(i): FIG. 3

FIG. 3 is a detailed block diagram of a single switch memory 211(i) in a preferred embodiment. Switch memory 211(i) includes 12 separate integrated circuits: 8 switch memory VLSIs (SWMV) 303 (0 . . . 7), a switch memory CPU IC 307, a boot ROM IC 309, a static RAM IC 311, and a communications IC 313. IC's 307, 309, 311, and 313 are connected to the 8 switch memory VLSIs by CPU bus 305. CPU IC 307 is a MIPS R3000-based microcontroller, part number IDT3052, manufactured by Integrated Device Technology.

As will be explained in more detail below, SWM CPU 307 controls the operation of switch memory 211(i) by setting parameters in the 8 switch memory VLSI's and moving packets among the queues in output queues 213(i). Additionally, SWM CPU 307 can read and write portions of packets stored in output queues 213(i). Boot ROM 309 contains code which is executed by SWM CPU 307 to put switch memory 211(i) into a condition in which it can commence operation; static RAM 311 contains programs and data by means of which CPU 307 controls switch memory 211(i). CPU 307 can transfer data between SRAM 311 and switch memory VLSI's 303(0 . . . 7). Communications link 313, finally, permits communication with CPU 307 by means of an RS 232 link 315. Using RS 232 link 315, data can be transfered between CPU 307 and the outside world, and thereby between SRAM 311 and switch memory VLSIs 303(0 . . . 7) and the outside world.

The switch memory VLSIs 303(0 . . . 7) are a slice implementation of switch memory 211. Slice implementations of components are made up of sets of identical integrated circuits which operate in parallel. Each of the integrated circuits processes a slice of the input to the component. In the case of switch memory VLSIs 303(0 . . . 7), the implementation is a nybble slice implementation: each VLSI 303(j) processes 4 bits (1 nybble) of the 32 bit inputs received from broadcast bus 207 and the 32 bit outputs made to bus 215(i). Beginning with the inputs, a switch memory VLSI 303(j) receives 4 bits via broadcast bus 207 from each of the 14 input portions 202(0 . . . 13). As shown in FIG. 3, switch memory VLSI 303(0) receives bits 0 . . . 3 from input portions 202(0) through 202(13), VLSI 303(1) receives bit 4 . . . 7 from those input portions, and so on through VLSI 303(7), which receives bits 28–31 from those input portions. Thus, the 8 switch memory VLSIs 303(0 . . . 7) together receive each 32-bit word output by output portions 202(0 . . . 13) on buses 206(0 . . . 13). Similarly, each switch memory VLSI 303(j) outputs 4 bits to bus 215(i). Switch memory VLSI 303(0) outputs bits 0 . . . 3 of bus 215(i), switch memory VLSI 303(1) outputs bits 4 . . . 7, and so on through switch memory VLSI 303(7), which outputs bits 28 . . . 31.

Each switch memory VLSI 303(j) also contains a set of queues (SWMVQ) 301(j). All of the queues 301(0 . . . 7) together make up output queues 213(i). Each queue 301(j) contains a four-bit slice of each 32-bit word stored in the queues in output queues 213(i). Thus, queue 301(0) will have bits 0 . . . 3 of each word, queue 301(1) will have bits 4 . . . 7, and so on. Of course, a packet is made up of many 32-bit words; consequently, for a packet 113(k) in output queues 213, bits 0 . . . 3 of each word in packet 113(k) will be stored in queues 301(0), bits 4 . . . 7 of each word in queues 301(1), and so forth.

Figure 4:
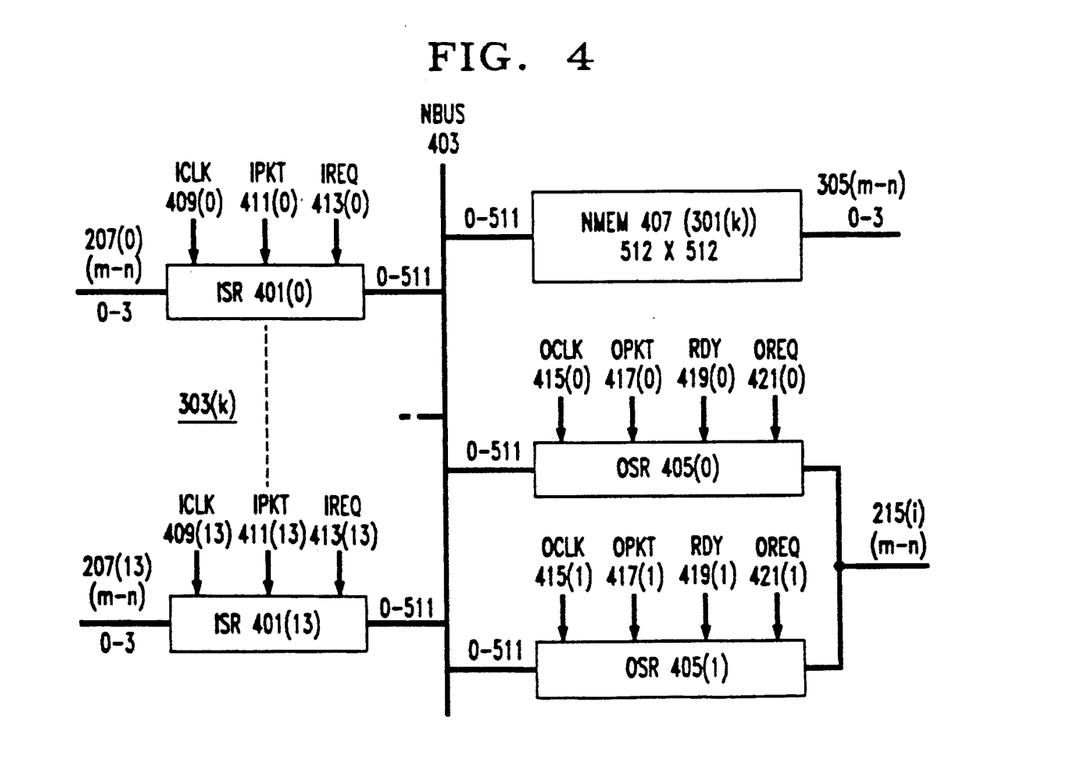
FIG. 4 is a block diagram of the data paths of a switch memory VLSI 303.

Main Data Paths in Switch Memory VLSI 303(k)

FIG. 4 gives a schematic overview of the main data paths in a single switch memory VLSI 303(k). The data paths connect 14 input shift registers (ISR) 401 with nybble memory 407 containing queues 301(k) and two output shift registers (OSR) 405. In a preferred embodiment, each of the input shift registers and output shift registers is 512 bits wide, as is nybble memory 407, which is organized as 512 512-bit words. Nybble memory 407, the input shift registers 401, and the output shift registers 405 are connected by a nybble bus 403, which is also 512 bits wide. Because nybble bus 403 is completely contained on VLSI 303(k), it is very short and has none of the electrical problems associated with very buses which connect separate integrated circuits.

As previously explained, each input portion 202 receives packets 113 as a sequence of bits from input link 203 and outputs a sequence of 32-bit words containing the packet's bits to broadcast bus 207. Further, each VLSI 303(k) receives sequences of four-bit slices m . . . n, one slice coming from each 32-bit word of the sequences of words output by input portions 202(0 . . . 13). The sequences of slices are received in the 14 input shift registers (ISR) 401(0 . . . 13), one corresponding to each of the input portions 202. Each input shift register is long enough to store slices of all of the 32-bit words making up the packet. Thus, the packet switch of the preferred embodiment can handle packets 113 with lengths up to 128 32-bit words. Input shift registers 401 are further double-buffered, so that they can begin receiving nybbles of another packet from their corresponding input portion 202 while waiting to output a packet they have just received to nybble bus 403. Similarly, VLSI 303(k) provides a four-bit slice m . . . n of each 32-bit word of each packet output to bus 215(i). These slices are output from one of output shift registers (OSR) 405(0 . . . 1) with the other being retained as a spare in case of malfunction.

Since both nybble bus 403 and nybble memory 407 are 512 bits wide, all of the slices in shift register 401 are written in a single operation to a row of nybble memory 407. Similarly, when output link 215(i) associated with switch memory 211(i) is ready to output a packet, the row of nybble memory 407 containing the nybble slices for the packet is read in parallel to the currently operating output shift register 405, which then provides the slices a nybble at a time to bits m . . . n of bus 215(i). Additionally, bits m . . . n of CPU bus 305 are received in nybble memory 407. This arrangement permits CPU 307 to read and write words of packets 133 stored in switch memory 211($i$).

Continuing with details about input shift registers 401 and output shift registers 405, each input shift register 401($k$) is controlled by three control signals:

- ICLK 409($k$) is a clock signal from input portion 202($k$) corresponding to input shift register 401($k$) which times the input of nibbles to shift register 401($k$).
- IPKT 411($k$) is a signal from router 207($k$) indicating that router 207($k$) has detected the end of the packet from which shift register 401($k$) is currently receiving nibbles.
- IREQ 413($k$) is a signal indicating that the nybbles in shift register 401($k$) are to be output to nybble bus 403. The manner in which it is generated will be described in more detail below.

Input shift register 401($k$) outputs its contents to nybble bus 403 when IPKT 411($k$) indicates that the end of a packet has been reached and IREQ 413($k$) indicates that the output link 221 corresponding to switch memory 211($i$) containing switch memory VLSI 303($k$) is to receive the packet.

IREQ 413($k$) is generated by switch memory VLSI 303(7) as follows: As is apparent from FIG. 3, switch memory VLSI 303(7) receives bits 28 . . . 31 of each word input from broadcast bus 207. At the end of each packet is the two-word output link specifier 223; as previously described, in output link specifier 223, bits 28 . . . 31 of each word together specify a set of one or more output links. In the preferred embodiment, IPKT signal 411($k$) received in an input shift register 401($k$) signals the end of the packet being sent on broadcast bus 207($k$) and also that the next two words on broadcast bus 207($k$) will be output link specifier Switch memory VLSI 303(7) consequently responds to IPKT signal 411($k$) by examining bits 28 . . . 31 of the next two words received on broadcast bus 207($k$). If these bits indicate that switch memory 211($i$) to which switch memory VLSI 303(7) belongs is to receive the packet, VLSI 303(7) in switch memory 211($i$) generates IREQ 413(0 . . . 13) for itself and all of the other VLSIs 303. Any input shift register 401($k$) which has just received an IPKT signal 411($k$) will respond to IREQ 413 by outputting its contents to nybble bus 403.

Each output shift register 405(1) is controlled by four signal inputs:

- OCLK 415($l$) is a timing signal received from transmitter 219($i$) which is receiving words from switch memory 211($i$) to which output shift register 405($l$) belongs; it controls the rate at which output shift register 405 outputs nybbles.
- OPKT 417($l$) is an end-of-packet signal received from chopper 217($i$) which indicates that the entire packet has been output by switch memory 211($i$).
- RDY 419($l$) is a ready signal provided to transmitter 219($i$) which indicates that output shift register 405($l$) is ready to provide data.
- OREQ 421($l$) is a signal provided to output shift register 405($l$) indicating that it is to load the data presently on nybble bus 403.

As can be seen from the foregoing list of control signals, output shift register 405($l$) outputs a serial sequence of nybbles until it receives OPKT 417($l$); at that point it indicates via RDY 419($l$) that it is no longer ready to transmit nybbles; when shift register 405($l$) receives OREQ 421($l$), the 512-bit word of nybble memory 407 which is next to be output from shift register 405($l$) is on nybble bus 403 and shift register 405($l$) responds by loading that word from nybble bus 403. Once the word is loaded, shift register 405($l$) sets RDY 419($l$) to indicate that it is ready and begins transmitting nybbles in response to output clock 415($l$).

A particular advantage of the fact that each input shift register 401 receives a separate ICLK signal 409 and each output shift register 405 receives a separate OCLK signal 415 is that there is no need for input portions 202 to be synchronized with nybble memory 407 or with each other and similarly no need for transmitter 219 to be synchronized with nybble memory 407 or with other transmitters 219. Indeed, it is even possible for different input portions 202 and different transmitters 219 to operate at different rates.

Figure 5:
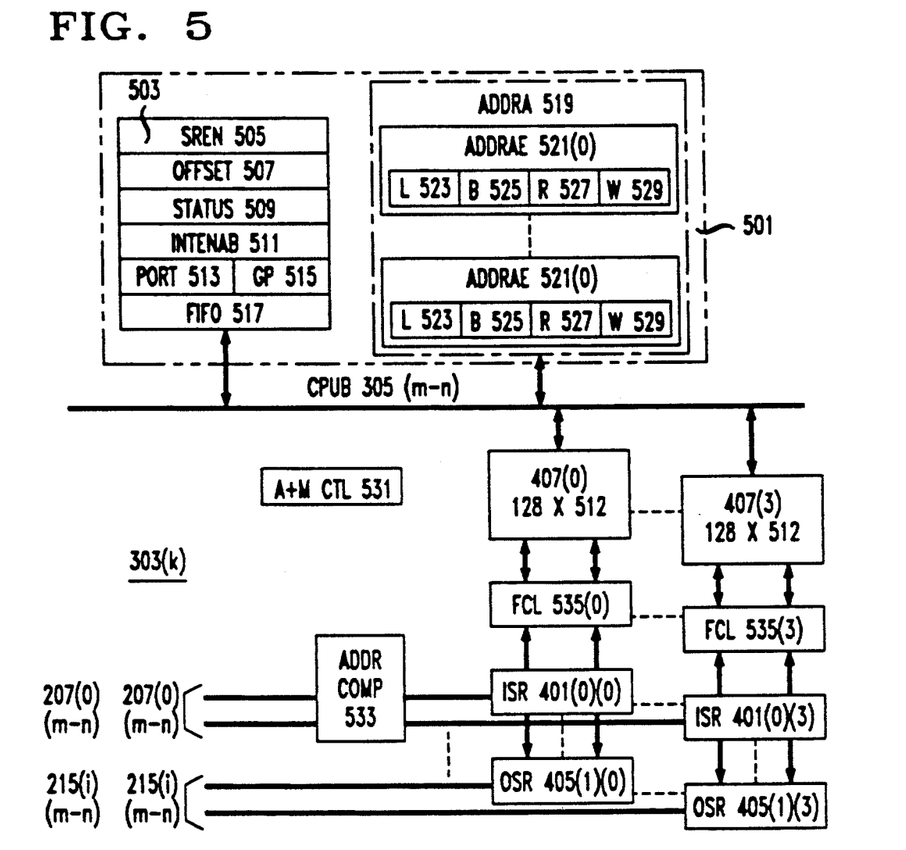
FIG. 5 is a block diagram of the functional components of switch memory VLSI 303.
Figure 6:
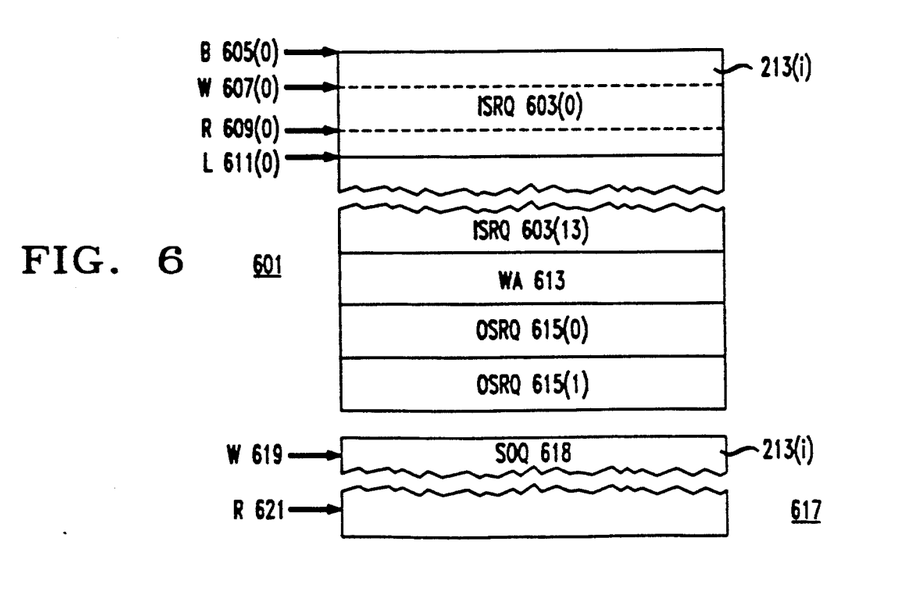
FIG. 6 is a diagram of the division of nybble memory 407 of switch memory VLSI 303 into queues.

Details of Switch Memory VLSI 303($k$): FIGS. 5–6

FIG. 5 provides further details of a preferred embodiment of switch memory VLSI 303($k$). Beginning with nybble memory 407, input shift registers 401, and output shift registers 405, in the preferred embodiment, nybble memory 407 is implemented as four 128×512 bit planes 407(0 . . . 3). The first bit of a given nybble is stored at a position in plane 407(0) and the second, third, and fourth bits are stored at the corresponding positions in plates 407(1 . . . 3). Nybble memory 407 receives data from and outputs data to fast copy latch 535, which is made up of four 128×1 bit planes. Fast copy latch 535 permits reading from one 512-bit word of nybble memory 407 and writing to another such word in a single read cycle followed by a single write cycle. The read cycle and write cycle are treated as an atomic operation.

FIG. 5 shows only one input shift register 401, namely ISR 401(0), and only one output shift register 405, namely OSR 405(1). Each input shift register 401 and output shift register 405 is implemented as four 128×1 bit planes, with the bits of a given nybble stored in the shift register being located at corresponding positions in the four planes. In the case of input shift registers 401, each plane is connected to one of the four lines of broadcast bus 207 which provides nybbles to the input shift registers and in the case of output shift registers 405, each plane is connected to one of the four lines of bus 215 which provide nybbles to transmitter 219($i$). Further, nybble bus 403 is connected between the four planes of the shift registers and the four planes of fast copy latch 535.

FIG. 5 further shows CPU interface 501 of switch memory VLSI 303($k$). CPU interface 501 is a set of registers which SWM CPU 307 may read and write via CPU bus 305. The values written to these registers by CPU 307 control the operation of switch memory 211($i$) to which the switch memory VLSI 303($k$) belongs. The sets of registers in all of the switch memory VLSIs (0 . . . 7) in a switch memory 211($i$) make up a single set of registers for the entire switch memory 211($j$). Each of the individual switch memory VLSIs (0 . . . 7) contains 1 nybbles of each register.

The first group of registers, bearing the reference numbers 505 through 517, have the following functions:

- SR EN 505 specifies which of output shift registers 405(0) and (1) is to be enabled for output.
- OFFSET 507 contains two values; the first indicates the point in input shift register 401 at which the first nibble of the packet being received is to be placed in input shift register 401; the second indicates the point in output shift register 405 at which the output of nybbles of the packet is to begin.

STATUS 509 is a set of bits which indicate the status of switch memory 211(j).

INT ENAB 511 enables switch memory VLSIs 303 to produce interrupts to which switch memory CPU 307 responds.

PORT 513 contains four bits making up the hexadecimal digit which specifies the number of output link 221 to which switch memory 211(j) belongs.

GP 515 contains 8 bits making up the group code indicating the group of output links 221 to which switch memory 211(j) belongs. In determining whether to accept a packet, switch memory 211(j) compares the contents of GP 515 with the packet's group code and accepts the packet if any bit in its group register matches the corresponding bit in the group code.

FIFO 517 indicates whether output queues 213(i) are organized as a single queue, in which case switch memory CPU 307 plays no role in the operation of switch memory VLSI 303(i), or as 16 queues, in which case CPU 307 manages the 16 queues.

Of the above registers, PORT 513, GP 515, and OFFSET 507 require more discussion. Beginning with PORT 513 and GP 515, as previously pointed out, in a preferred embodiment, only VLSI 303(7) in a switch memory 211(i) receives the relevant bits of output link specifier 223. VLSI 303(7) generates IREQ 413(k) to the other VLSI 303(i)'s when a comparison between output link specifier 223 and the values in PORT 513 and GROUP 515 indicates that switch memory 211(i) is to retain the packet. The comparison is made by address comparator 533, which is connected to broadcast bus 207(28...32). Address comparator 533 is included in all VLSI 303(i)'s, but only the comparison in VLSI 303(7) results in the generation of IREQ 413(k). In a preferred embodiment, a bit (not shown) in control registers 503 is set to indicate which of the VLSIs 303(0 . . . 7) is to generate IREQ 413(k).

OFFSET 507 permits switch memory CPU 307 to "reserve space" ahead of a packet. When the nybbles of the packet are received in input shift registers 401, they are placed in the input shift registers 401 beginning at the location in the shift registers specified by the value in OFFSET 507. The entire contents of input shift register 401 are then moved as previously described into nybble memory 407, including the "empty" portion of input shift register 401 ahead of the position indicated by the first value in OFFSET 507. Switch memory CPU 307 can then write information into that empty portion. Further, by setting the second value in OFFSET 507, switch memory CPU 307 can determine how much of the contents of the packet and the "empty" portion are output to transmitter 219. By setting values in OFFSET 507, switch memory CPU 307 can perform operations such as adding a new header to a packet, deleting a header that is no longer needed, or adding information to a packet which is needed only while the packet is in the packet switch.

The use of OFFSET 507 illustrates an important principle of the packet switch of the present invention: that the nybbles belonging to the packets, and therefore the packets, are always moved in their entirety, be it between the shift registers and nybble memory 407 or within nybble memory 407. Another feature of the packet switch which illustrates this principle is of course fast copy latch 535.

The remaining registers in CPU interface 501 belong to address array (ADDRA) 519, which contains address information about the 16 queues into which output queues 213(i) in switch memory 211(i) may be organized. Address array 519 will be discussed in detail together with the organization of switch memory 211(i).

Yet to be discussed is arbitration and memory control 531. It has two functions: managing the queues in nybble memory 407, which will be discussed in connection with those queues, and arbitrating access to nybble memory 407. As is apparent from FIG. 4, data flows between nybble memory 407 and any of 17 sources and destinations: the 14 input shift registers and the two output shift registers via nybble bus 403 and switch memory CPU 307 via CPU bus 305. Arbitration and memory control arbitrates among these sources and destinations as follows: as regards the sources and destinations connected to nybble bus 403, the active output shift register 405 has the highest priority, followed by the 14 input shift registers 401. If more than one input shift register 401 is contending, the input shift registers 401 are given access to the bus in round-robin fashion. Memory accesses by CPU 307 via CPU bus 305 have the lowest priority.

Continuing with the organization of output queues 213(i), FIG. 6 shows details of their organization. There are two modes, determined by the setting of FIFO register 517. Mode 617 shows the organization when FIFO register 517 indicates that output queues 213(i) is organized as a single queue. In that case, output queues 213(i) function as a single circular output queue (SOQ) 618. Any packet received from the set of input shift registers 401 corresponding to a particular input portion 202 which is destined for output link 221(i) is placed at the tail of single output queue 618, which is indicated by write pointer 618; meanwhile, the active output shirt register 405(i) reads packets from the head of single output queue 618, which is indicated by read pointer 621. As the writes and reads occur, pointers 619 and 621 are automatically updated by hardware in arbitration and memory control 531. In this mode, switch memory VLSI 303s can operate without a switch memory CPU 307.

Mode 601 shows how switch memory CPU 307 can organize output queues 213(i) and thereby the nybble memories 407 which make them up into 16 circular queues and a waiting area. The queues are the following: an input shift register queue (ISRQ) 603 for each of the 14 input shift registers 401 and an output shift register queue (OSRQ) 615 for each of the two output shift registers 405. Switch memory CPU 307 employs waiting area (WA) 613 to transfer packets from one of the input shift register queues to one of the output shift register queues. While a packet is in waiting area 613, switch memory CPU 307 may read or modify the contents of the header or the message, as well as the contents of any "empty space" stored with the packet.

Switch memory CPU 307 defines the locations and sizes of the 16 input shift register queues 603 and output shift register queues by means of address array 519. There is an address array entry 521 for each of the 16 queues; each entry 521 contains four fields. Two of the fields define the boundaries of the queue's area of nybble memory 407:

base field (B) 525 contains base pointer 605 for the queue. The base pointer indicates the start of the queue's area in nybble memory 407;

limit field (L) 523 contains limit pointer 611 for the queue; the limit pointer indicates the end of the queue's area in nybble memory 407.

These fields are set by switch memory CPU 307. The remaining two fields define the current head and tail of the queue.

read field (R) 527 contains read pointer 609, which indicates the address of the packet currently at the head of the queue.

write field (R) 529 contains write pointer 607, which indicates the address of the next location at which a packet may be written to the queue. The read and write fields are updated automatically by arbitration and memory control 531 as packets are read from and written to the queues.

Operation of nybble memory 407 in non-FIFO mode is as follows: when the input shift registers 401 for an input portion 202 contain an entire packet, the input shift register 401 for the input portion in each of the switch memory VLSIs 303 indicates to control 531 that it wishes to write to nybble memory 407; control 531 responds by waiting until the arbitration logic gives that input shift register 401 access to nybble bus 403 and then writes the packet to the location indicated by write pointer 607 in the input shift register queue 603 corresponding to the input shift register.

Switch memory CPU 307 moves packets from the heads of the input shift register queues 603 (indicated by read pointers 609) to locations in waiting area 613; it then moves packets from the locations in waiting area 613 to the tail of output shift register queue 615 for the active output shift register 405; these moves are done using fast copy latch 535. When the active output shift register 405 has finished outputting the packet which it currently contains to bus 215, it signals control 531 that it is ready for the next packet, and control 531 places the packet at the head of output shift register queue 615 for active output shift register 405 on nybble bus 403, from whence it is loaded into active output shift register 405.

An advantage of non-FIFO mode 601 is that it may be used to implement a packet network in which packets may have differing priorities. For example, the packets may move in virtual circuits, and a virtual circuit which is connecting real-time devices such as a TV transmitter and a TV receiver may have a higher priority than a virtual circuit which is connecting non-real-time devices such as the electronic mail programs in two computer systems. Such a system may be implemented in non-FIFO mode 601 by employing switch memory processor CPU 307 to set up a high-priority and a low-priority queue in waiting area 613. These queues are managed completely by CPU 307. CPU 307 then moves a packet from an input shift register queue 603, examines the packet's header to determine its priority, then, depending on the priority, places the packet in either the high-priority or the low-priority queue. CPU 307 may then move some number of packets from the high priority queue in waiting queue 613 to the tail of output shift register queue 615 before it moves any from the low priority queue to the tail of that queue, thus giving the high-priority packets access to output link 221 more often than the low-priority packets.

Figure 7:
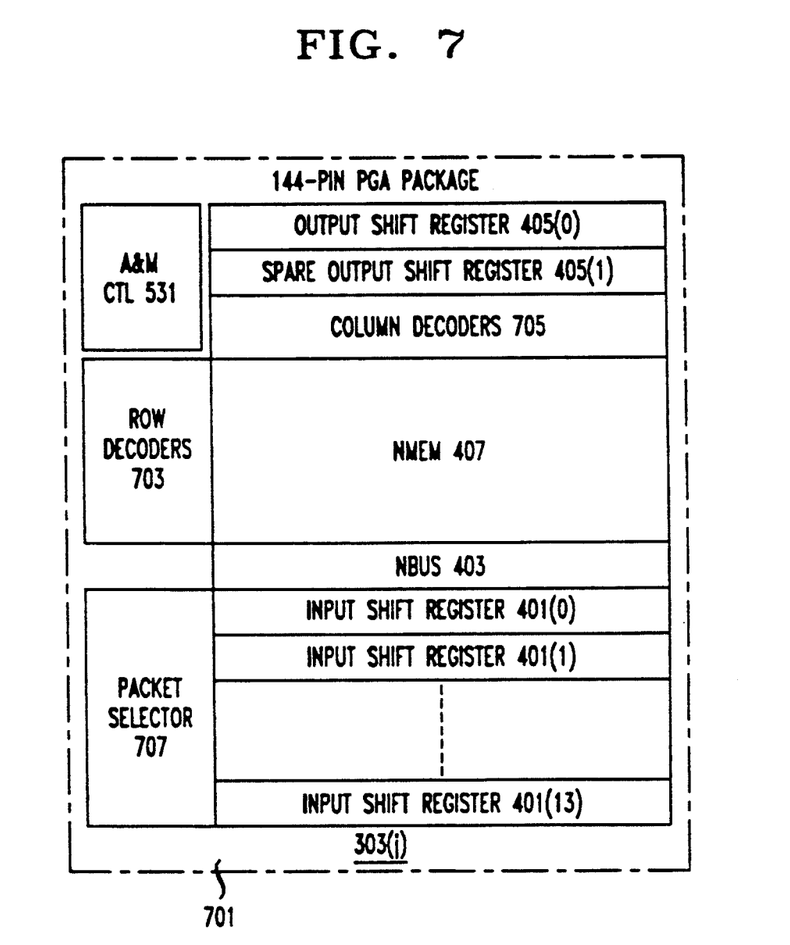
FIG. 7 is a diagram of the arrangement of the chief components of switch memory VLSI 303 in the VLSI.

Layout of Switch Memory VLSI 303(j): FIG. 7

FIG. 7 shows the layout of a preferred embodiment of switch memory VLSI 303(j) in a 175-pin PGA package 701. The preferred embodiment is implemented using an 0.5 micron 2-level metal CMOS process. There are approximately 1.3 million devices on the chip, with most of them being used to implement nybble memory 407 and the 16 shift registers 401 and 405. Nybble memory 407, implemented as a static RAM cell array, is in the center of FIG. 7; at its top and left side are the column decoders 705 and the row decoders 703 which address the cells of nybble memory 407. Above column decoders 705 are the two output shift registers 405; below nybble memory 407 are nybble bus 403 and the 14 input shift registers 401; packet selector 707 determines which of shift registers 401 is to output its contents to nybble memory 407, and arbitration and memory control 531 performs the arbitration and memory control functions previously discussed.

144 of the 175 pins in the package are used for the device; of these, there are 26 power and ground pins, 56 pins for data inputs to the input shift registers 401, and 14 pins each for the ICLK, IPKT, and IREQ control inputs to the input shift registers. There are further 8 pins for data outputs from the output shift registers 405 and two pins each for the OCLK, OPDT, RDY, and OREQ signals. The interface between switch memory CPU 307 and switch memory VLSI 303(j) has 39 pins; four are for input and output of data, 21 are for addresses in input queues 213, and the remainder are for the following signals:

SYSCLK: the system clock for switch memory 211;
    RESET: reset the switch memory VLSI 303(j);
    CS: select the switch memory VLSI 303(j);
    RD: specify a read or a write operation on nybble memory 407;
    IACK: specify that data has been received by CPU 307 in a read operation;
    BURST: specify a burst read or write operation;
    OE: enable outputs from the active output shift register 405;
    DTACK: indicate that data has been received from CPU 307;
    INT: interrupt to CPU 307.

As is apparent from the foregoing set of signals, switch memory CPU 307 can read and write individual nybbles of packets stored in output queues 213.

Conclusion

The foregoing Detailed Description has disclosed to one of ordinary skill in the art how a packet switch may be constructed which avoids the speed problems associated with standard memory VLSIs and the electrical problems associated with very wide busses which cross chip boundaries. The packet switch of the invention includes switch memory VLSIs. Each switch memory VLSI contains memory which is wide enough to store 1 nybble from all of the words of the packet in parallel and a data path which is as wide as the memory and which connects the memory to shift registers into which and from which the nybbles to be stored in the memory are transferred serially. Because the memory is very wide and the data paths do not cross chip boundaries, the speed and electrical problems of the prior art are avoided, very high memory bandwidths are achieved, and the packet switch can operate at a higher rate than prior-art packet switches with memory.

As will be apparent to those of ordinary skill in the art, many other embodiments which incorporate the principles of the packet switch disclosed herein are possible. The preferred embodiment is designed for packet switching systems in which the packets may have varying lengths; however, the principles of the invention are equally advantageous in systems in which the packets have a fixed length, such as systems using the 53-byte ATM packets.

Many additional embodiments are possible. For example, the switch memories may be organized to increase the number of input links, they may be organized to receive words of different sizes, and they may be organized in the same fashion as interleaved memories. Further, individual switch memory VLSIs may receive or output slices which are larger or smaller than the nybbles employed in the preferred embodiment, and as feature sizes in integrated circuits decrease, both the data paths and the memories in the switch memory VLSIs may be made wider and other devices may be incorporated into the switch memory VLSIs. Additionally, while the preferred embodiment is implemented using CMOS technology, the techniques of the invention are in no way dependent on that technology. Finally, other embodiments may employ different organizations of the memory in the switch memory, as required for the queueing discipline employed in the packet switch to which the switch memory belongs. Such organizations may be predefined, as is the case with the FIFO mode in the preferred embodiment, or they may be defined by a processor.

The above being the case, the Detailed Description is to be understood as being in all respects illustrative and exemplary, but not restrictive, and the scope of the invention disclosed herein is to be determined solely from the claims as read in light of this Specification and interpreted according to the doctrine of equivalents.

What is claimed is:

1. A switch fabric for switching packets having components comprising:
   packet receiving means coupled to a plurality of input ports for serially receiving the packets from the input ports;
   packet outputting means coupled to a plurality of output ports for serially outputting the packets to the output ports;
   packet memory means for storing the packets; and
   packet transfer means for transferring the packets in parallel between the packet receiving means, the packet outputting means, and the packet memory means,
   the components being distributed over one or more integrated circuits such that the transfer means remains within the boundaries of the integrated circuits.

2. The switch fabric set forth in claim 1 wherein:
   the switch fabric is subdivided into a plurality of switch memories, each one of the switch memories being coupled to at least one of the output ports and a plurality of the input ports and each one of the switch memories comprising:
   a plurality of switch memory packet receiving means for receiving packets from the input ports to which the switch memory is coupled,
   a switch memory packet outputting means for outputting packets to the output port to which the switch memory is coupled,
   switch memory packet accepting means coupled to each one of the switch memory packet receiving means for accepting only those packets received in the switch memory packet receiving means which are to be output to the output port to which the switch memory is coupled,
   switch memory packet memory means for storing the accepted packets, and
   switch memory packet transfer means for transferring the accepted packets in parallel between the plurality of switch memory packet receiving means, the switch memory packet memory means, and the switch memory packet outputting means,
   and wherein
   in the plurality of switch memories,
   the plurality of switch memory packet receiving means make up the packet receiving means,
   the switch memory packet outputting means make up the packet outputting means,
   the switch memory packet memory means make up the packet memory means, and
   the switch memory packet transfer means make up the packet transfer means.

3. The switch fabric set forth in claim 2 wherein:
   the packets received by the switch memories are received as a sequence of words;
   each one of the switch memories includes a plurality of switch memory integrated circuits, each of which processes a slice of the words;
   each switch memory integrated circuit includes
   a plurality of input shift register means for serially receiving the slices from the plurality of input ports to which the switch memory is coupled,
   an output shift register means for serially outputting slices of the sequences of words of accepted packets to the output port to which the switch memory is coupled,
   slice accepting means coupled to the input shift register means for accepting only received slices of accepted packets,
   slice memory means for storing the slices of the accepted packets,
   slice transfer means for transferring the slices of the accepted packets in parallel between the input shift register means, the output shift register means, and the slice memory means, and
   in the plurality of switch memory integrated circuits, the input shift register means make up the switch memory packet receiving means, the output shift register means make up the switch memory packet outputting means, the slice accepting means make up the switch memory packet accepting means, the slice memory means make up the switch memory packet memory means, and the slice transfer means make up the switch memory transfer means.

4. The switch fabric set forth in claim 1 wherein:
   the rate at which any one of the packet receiving means receives the packets is independent of the rate at which any other of the packet receiving means receive the packets.

5. The switch fabric set forth in claim 1 wherein:
   the rate at which any one of the packet outputting means outputs the packets is independent of the rate at which any other of the packet outputting means output the packets.

6. The switch fabric set forth in claim 1 wherein:
   the switch fabric further comprises packet accepting means for accepting received packets for output to the output ports as required for the packets' destinations.

7. The switch fabric set forth in claim 6 wherein:
   the packet accepting means accepts received packets for output to any set of the output ports.

8. The switch fabric set forth in claim 1 further comprising:
input offset means for specifying that a portion of the packet receiving means not be occupied by the packets and
the transfer means transfers the unoccupied portion to the packet memory means together with the packets.

9. The switch fabric set forth in claim 1 further comprising:
output offset means for specifying that a portion of the contents of the packet outputting means not be output when the packets are output.

10. The switch fabric set forth in any of claims 8 or 9 further comprising:
switch fabric control means capable of setting the input offset means or the output offset means and accessing the packet memory means, whereby the switch fabric control means is capable of accessing the unoccupied portion in the packet memory means.

11. The switch fabric set forth in claim 1 further comprising:
means for moving packets stored in the packet memory means in parallel between locations in the packet memory means.

12. The switch fabric set forth in claim 11 further comprising:
switch fabric control means capable of controlling the means for moving packets.

13. The switch fabric set forth in claim 12 wherein:
the switch fabric control means is further capable of accessing portions of packets in the packet memory means.

14. The switch fabric set forth in claim 1 wherein:
the switch fabric operates in a first mode wherein the packet memory means is a single queue.

15. The switch fabric set forth in claim 14 wherein:
the switch fabric further operates in a second mode wherein the packet memory means contains a plurality of queues.

16. The switch fabric set forth in claim 15 wherein the switch fabric further comprises:
mode specification means for specifying the first mode and the second mode;
queue specification means for specifying the plurality of queues; and
switch fabric control means for setting the mode specification means and the queue specification means.

17. The switch fabric set forth in claim 16 wherein:
the switch fabric control means further moves packets between the queues in the plurality of queues.

18. The switch fabric set forth in claim 17 wherein the switch fabric further comprises:
means for moving packets stored in the packet memory means in parallel between locations in the packet memory means; and
the switch fabric control means employs the means for moving packets to move the packets between the queues.

19. A switch fabric for switching packets comprising
a plurality of packet receiving means coupled to a plurality of input ports for serially receiving and holding substantially entire packets from the input ports,
a plurality of packet outputting means coupled to a plurality of output ports for receiving substantially entire packets and serially outputting the received packets to the output ports, and
means for transferring the packets from the packet receiving means to the packet outputting means,
and wherein
the rate at which any of the plurality of packet receiving means receives its packets is independent of the rate at which any other packet receiving means of the plurality thereof receives its packets.

20. The switch fabric set forth in claim 19 further characterized in that:
the rate at which any of the plurality of packet outputting means outputs its packets is independent of the rate at which any other packet outputting means of the plurality thereof outputs its packets.

21. A switch fabric for switching packets comprising:
packets receiving means coupled to a plurality of input ports for serially receiving and holding substantially entire packets from the input ports;
packet outputting means coupled to a plurality of output ports for receiving substantially entire packets and serially outputting the packets to the output ports;
packet memory means for storing the packets;
packet transfer means for transferring substantially entire packets in parallel between the packet receiving means, the packet outputting means, and the packet memory means; and
means for moving substantially entire packets in parallel between locations in the packet memory means.

22. The switch fabric of claim 21 further characterized by:
switch fabric control means for controlling the means for moving packets.

23. A packet switch comprising:
a plurality of receiver means for receiving packets from input links;
a plurality of transmitter means for providing received packets to output links; and
a switch fabric coupled between the plurality of receiver means and the plurality of transmitter means, the switch fabric having components including
packet receiving means coupled to the plurality of receiver means for serially receiving the packets from the receiver means;
packet outputting means coupled to the plurality of transmitter means for serially outputting the packets to the transmitter means;
packet memory means for storing the packets; and
packet transfer means for transferring the packets in parallel between the packet receiving means, the packet outputting means, and the packet memory means.
the components being distributed over one or more integrated circuits such that the packet transfer means remains within the boundaries of the integrated circuits.

24. The packet switch set forth in claim 23 wherein:
the switch fabric is subdivided into a plurality of switch memories, each switch memory being coupled to at least one of the transmitters;
the packet switch further comprises broadcast bus means for coupling the plurality of receiver means to the switch fabric such that each of the plurality of switch memories receives packets from all of the receiver means; and
each switch memory further includes switch memory packet accepting means for accepting only those packets received in the switch memory which are to be output by the transmitter means to which the switch memory is coupled.

* * * * *